3,336,415
CURABLE POLYAMIDE/POLYEPOXIDE ADHESIVES CONTAINING AMINO-ALKOXYDIOXABORINANE AND DIAMIDE OR PHENOLIC RESIN
Richard J. Kennedy, Wilmington, Del., assignor to E. I. du Pont de Nemours and Company, Wilmington, Del., a corporation of Delaware
No Drawing. Filed Aug. 27, 1964, Ser. No. 392,321
28 Claims. (Cl. 260—831)

ABSTRACT OF THE DISCLOSURE

Blends of alcohol-soluble polyamides and polyepoxides are cured with a mixture of an aminoalkoxydioxaborinane such as 2-(betadimethylaminoethoxy)-4-methyl-1.3.2-dioxaborinane and a diamide such as cyanoguanidine or a phenolic resin.

---

This invention relates to polyamide-polyepoxide adhesive compositions. More particularly, it relates to a curing composition which permits achievement of the optimum adhesive properties for a polyamide-polyepoxide adhesive composition.

Adhesive compositions comprising a synthetic polyamide and a polyepoxide are old in the art. A particularly promising application of this adhesive to which the metal industry has shown considerable interest is the bonding of metal/metal laminates. The basic requirements for metal/metal laminates are: (1) an initial peel strength of at least about 20 lb./in.; (2) flexibility to withstand post forming operations; and (3) a cure schedule not exceeding about 60 seconds. The latter requirement is necessitated by the fact that the lamination process, to be economically feasible, should be continuous. It is generally true, however, that higher peel strengths are achieved by extending the curing time. Increasing the curing temperature will not necessarily compensate for the reduction in curing time, although it may do so within a narrow temperature range, because of the phenomenon known as "over-cure," which leads to nearly a complete loss in bond strength. The task, therefore, is to achieve the optimum adhesive properties for a particular adhesive composition, in this case a polyamide-polyepoxide system. By the term "optimum adhesive properties" is meant the highest peel strength or tensile sheer values that can be obtained at a particular cure time.

In order to achieve the optimum adhesive properties of the polyamide-polyepoxide system with regard to the industry requirements for metal/metal laminates, curing agents must be employed. There are several types of curing agents which are known to effect crosslinking of resin chains in these polyamide-polyepoxide compositions to form a tough, hard, thermoset material. The most generally used curing agents are primary and secondary amines, organic acids, and organic acid anhydrides. Many of these presently used curing agents react with the polyepoxides at relatively low temperatures and thus once they are added to the basic adhesive composition, the composition must be used in a very short period of time or pre-cure will ruin the adhesive. Others of these known curing agents are not sufficiently rapid-curing to be useful in a continuous laminating process.

It is therefore an object of this invention to provide an improved bonding composition. Another object is to provide a rapid-curing structural-type bonding composition which will exhibit optimum adhesive properties when used as the bonding agent in a continuous laminating process. Another object is to provide a laminated structure which will have a high peel strength, and be sufficiently flexible to withstand post-forming operations such as bending. Still another object is to provide a process for making a laminated structure exhibiting these properties without requiring pretreatment of the substrate surfaces. These and other objects will become more apparent in the course of the following specification and claims.

These objects are accomplished in the present invention by providing a curing composition for the polyamide-polyepoxide adhesive, the curing composition comprising (1) a compound selected from the class having the formula

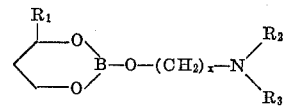

wherein $x$ is an integer from 1 to 5 and $R_1$, $R_2$, and $R_3$ are members selected from the class consisting of hydrogen and lower alkyl, and (2) at least one compound selected from the class consisting of cyanoguanidine, urea, thiourea, and a phenolic resin.

Although both classes of compounds depicted by (1) and (2) above have been employed individually as curing agents for adhesive systems, the combination of (1) and (2) as a curing composition for an adhesive appears to be novel. As will appear hereinafter, this combination of curing agents shows a synergistic effect in the curing of the polyamide-polyepoxide composition which is entirely unexpected from the knowledge of their individual activities.

The curing process for the polyamide-polyepoxide composition comprises intimately mixing therewith the curing composition set forth above, and then heating the resultant mixture to a temperature of from about 370° F. to about 500° F. for from about 30 seconds to about 60 scoends. Where a continuous laminaating process is not employed the cure time can be lengthened The components of the adhesive composition can be dissolved in an inert solvent rather than intermixed. A suitable solvent is a 50:50 mixture of methanol and trichloroethylene. The solvent can be removed before curing temperatures are attained. The adhesive solutions are stable for up to 14 months. If desired, the adhesive composition of this invention may be cast in the form of a film or tape by any of the methods familiar in the art.

When employing the bonding composition in a laminating process, the steps thereof comprise (1) applying a bonding composition comprising a mixture of polyamide-polyepoxide resins and the curing composition of this invention to at least one of the surfaces to be laminated, (2) then sandwiching the surfaces to be laminated together with the adhesive composition therebetween, and (3) thereafter curing the bonding composition.

The following examples serve to illustarte the invention and are not intended to limit the scope thereof in any manner. All parts and percentages are by weight unless otherwise specified. The peel strength of the laminates formed in the following examples are determined in accordance with Federal Test Method, Standard No. 175, Method 104.1 as described in Guttman: Concise Guide to Structural Adhesives, Rheinhold Publishing Corp. (1961), p. 172. The polyamide employed in the following examples is a solid (powdered) interpolyamide of about 40% by weight hexamethylene adipamide, about 30% hexamethylene sebacamide and about 30% caprolactam, having a molecular weight of about 25,000. The polyepoxide contained in the adhesive composition employed in the following examples is a heat-hardenable epoxy resin having an epoxy equivalent of 150 sold under the trade name "Epon 812." The curing agent 2-(β-dimethylaminoethoxy) - 4 - methyl - 1.3.2-dioxaborinane employed in the following examples and sold by U.S. Borax Research under the trade name "USB–110" has the following structural formula:

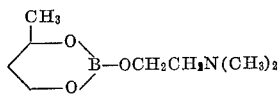

The phenolic resin employed in the following examples is sold under the trade name "Methylon 75108" by General Electric. Cyanoguanidine, having the structural formula

is a commercially available compound decomposing at 145° C.

Example I

The following example illustrates the general procedure involved in the preparation of a typical adhesive bonded metal/metal structure.

Polyamide resin (8 g.) is dissolved in 90 g. of a 50/50 methanol/trichloroethylene solvent system with heat and stirring. The polyamide solution is allowed to cool to room temperature, and then the polyepoxide "Epon 812" (2.0 g.), 2-(β-dimethylaminoethoxy)-4-methyl-1.3.2.-dioxaborinane (0.2 g.) and finely divided alumina powder (3.0 g.) are added. The resultant slurry is then stirred briskly for 15–30 minutes and applied by brushing on the metal substrate to yield a film thickness (after an initial drying at room temperature followed by subsequent drying at 120° F.) of about 0.0007 inch to about 0.0008 inch. The adhesive solution may be applied to one or both of the substrates to be bonded or may be cast into film and used in this manner. Bond formation is effected by means of either a Sentinel Heat Sealer at a clamping jaw pressure of 10 p.s.i. and a temperature of 450° C. for 60 seconds or a Carver Press under the same conditions of heat and under slight contact pressure.

Example II

This example illustrates the synergistic effect on peel strength obtainable with a curing agent composition of this invention.

The general procedure of Example I was employed in forming the laminates. Table I gives the results for various curing agent compositions. One layer of the laminate is stainless steel (0.005 inch thick) and the other is carbon steel (0.063 inch thick). The stainless steel surface is not pre-treated, however, hydrogen annealing has removed most of the surface contaminants. The carbon steel is washed with alkaline cleaner to yield break-free water film. The basic adhesive is an 80/20 by weight mixture of polyamide resin/"Epon 812" polyepoxide in 1:1 by volume methanol/trichloroethylene. The bond is effected using a Sentinel Heat Sealer at a clamping jaw pressure of 10 p.s.i. while the laminate is held at 450° F. for 60 seconds. Column 1 below indicates the parts per hundred parts by weight of polyepoxide of cyanoguanidine present in the curing composition. Column 2 indicates the parts per hundred parts by weight of polyepoxide of 2-(β-dimethylaminoethoxy)-4-methyl-1.3.2.-dioxaborinane present.

TABLE I

| I | II | Peel (lbs./in.) |
|---|---|---|
| 0 | 3 | 30–35 |
| 0 | 6 | 10–15 |
| 0 | 9 | 10–20 |
| 3 | 0 | 40–50 |
| 6.5 | 0 | 30–40 |
| 9 | 0 | 50–60 |
| 10 | 5 | 90–100 |
| 10 | 10 | 100–120 |
| 5 | 10 | 30 |

Example III

This example illustrates the curing composition of this invention employed in a continuous laminating process. The basic features necessary for a continuous laminating process include (1) separate sources for the metal sheets which are to be laminated, (2) applicator means for applying the bonding composition to one or both of the individual substrates, (3) heating means for heating the bonding composition to curing temperatures, (4) pressing means for bringing the individual substrates together in laminated relationship, and (5) conveying means for conveying the metal substrates and resultant laminate from the source to the end of the line. Many other features will be found necessary for particular embodiments of such a continuous process. For example, where the bonding composition is applied to the substrates as a solution, auxiliary heating means must be present to drive off the solvent prior to laminating. The bonding composition may also be used in the form of a film which can be continuously fed between the substrates to be laminated prior to bringing the substrates together. The most suitable pressing means in such a continuous process would be nip rolls. The pressure exerted by such rolls can be varied considerably while still accomplishing suitable lamination.

Approximately two gallons of each adhesive of Table II below in methanol/trichloroethylene (1:1 by volume) is prepared with an initial solids content between 12–14% by weight. During the operation of the laminating line, solvent losses at the bonding composition applicator means require the addition of more methanol. Neither the stainless steel foil (4 mils thick) or the zinc coated steel (20 gauge) is pre-treated, and water-film tests indicate both substrates surfaces are dirty. The operating speed of the laminating line is such as to permit a 60-second cure time. The nip rolls exert a pressure of approximately one hundred pounds. The wet film thickness is approximately 4–5 mils but varied due to solvent evaporation. Dry film thickness or glue-line is less than 1 mil. The results of this continuous laminating process using the bonding compositions shown in Table II are given in Table III.

TABLE II

| | Parts per hundred parts polyepoxide | | |
|---|---|---|---|
| | Adhesive #1 | Adhesive #2 | Adhesive #3 |
| Polyamide | 8 | 8 | 8 |
| "Epon 812" | 2 | 2 | 2 |
| USB–110 | 0.2 | 0.2 | 0.2 |
| Cyanoguanidine | 0.2 | | |
| "Methylon 75108" | | 0.5 | 1.0 |
| Alumina * | 2.8 | 2.8 | 2.8 |

* Basic (cationotropic), activity grade 1 for chromatography, sold by M. Woelm-Eschwege.

TABLE III

| Adhesive | Temp., ° F. | | Peel Strength (lbs./in.) |
|---|---|---|---|
| | Sheets before lamination | Laminate | |
| 1 | 450 | 450 | 25–29 |
| | 480 | 480 | 25–29 |
| 2 | 510 | 310 | 24 |
| | 480 | 310 | 26 |
| | 450 | 450 | 23 |
| 3 | 430 | 400 | 29 |
| | 500 | 375 | 26–23 |
| | 480 | 375 | 29 |

S—Stainless Steel foil, Type 302, bright annealed, thickness 0.005.
G—Galvanized steel, 0.063 inch thick, zinc dipped.
C—Mild carbon steel, 24 gauge.

Surface pre-treatment:

Sil—"Silicone Y–2102," a trade name for a silicon resin solution sold by Union Carbide, is brushed on the substrates prior to bonding.

HCl—The carbon substrate is dipped in 5% HCl for 10 minutes and dried prior to bonding.

Alk—The substrate is washed with an alkaline cleanser until the substrate shows a break-free water film.

TABLE V

| Components: | | | | | | | | | | | | | |
|---|---|---|---|---|---|---|---|---|---|---|---|---|---|
| Polyamide Rosin | 8 | 8 | 8 | 8 | 8 | 8 | 8 | 8 | 8 | 8 | 8 | 8 | 8 |
| "Epon 812" | 2 | 2 | 2 | 2 | 2 | 2 | 2 | 2 | 2 | 2 | 2 | 2 | 2 |
| USB–110 | 0.2 | 0.2 | 0.2 | 0.2 | 0.2 | 0.2 | 0.2 | 0.2 | 0.2 | 0.2 | 0.2 | 0.2 | 0.2 |
| "Methylon 75108" | 0.5 | 0.5 | | | | 0.5 | 0.5 | | 0.5 | | 0.5 | 0.5 | |
| Alumina | 3 | 3 | 3 | 3 | 10 | 3 | 3 | 3 | 3 | | | 3 | 3 |
| Cyanoguanidine | | | | 0.2 | 0.2 | | | 0.2 | | 0.2 | | | 0.2 |
| Silicone Y–2102 | | | | | | | | 0.01 | | | | | |
| Substrates | S/G | S/G | S/C | S/C | S/C | S/G | S/G | S/G | S/G | S/C | S/C | S/C | S/C, S—None, C—HCl |
| Surface Pre-treatment | None | None | None | None | None | Sil | None | None | None | None | None | None | |
| Bonding Procedure | I | I | I | I | I | I | I | II | II | II | II | II | II |
| Cure Schedule: | | | | | | | | | | | | | |
| Temp., ° F | 356 | 392 | 410 | 410 | 410 | 410 | 428 | 480 | 550 | 446 | 446 | 450 | 450 |
| Time, mins | 0.5 | 0.5 | 0.75 | 1.0 | 0.75 | 0.5 | 0.5 | 0.75 | 0.75 | 0.75 | 0.75 | 1.5 | 1.5 |
| Peel, lbs./in | 75 | 90 | 75 | 50 | 70 | 30 | 85–110 | 80–90 | 85–90 | 80–90 | 50–60 | 70–75 | 85–95 |

*Example IV*

This example illustrates the use of the phenolic resin "Methylon 75108" in the curing composition of this invention in various concentrations.

The bonding procedure is generally the same as described in Example I. The basic adhesive is an 80/20 parts by weight mixture of polyamide and "Epon 812," respectively. The substrates are stainless steel (0.005 inch thick) and galvanized steel (0.063 inch thick). Neither substrate is pre-treated. A Sentinal Heat Sealer is employed, and the laminate is cured at 450° F. for 180 seconds. The quantity of phenolic resin is expressed in parts of phenolic resin solids per hundred parts by weight of epoxy resin. The compound 2-($\beta$-dimethylaminoethoxy)-4-methyl-1.3.2-dioxaborinane is present with the phenolic resin to the extent of 2 parts per hundred parts by weight of polyepoxide.

TABLE IV

| Phenolic resin: | Initial peel strength (lbs./in.) |
|---|---|
| 0.25 | 45–50 |
| 0.50 | 70–80 |
| 0.75 | 60–70 |
| 1.00 | 60–65 |

*Example V*

This example illustrates the use of the curing agent compositions of this invention using various substrates and laminating conditions. The basic procedure is the same as that described in Example I. The significance of the symbols employed in Table V is as follows:

Bonding procedure:

I—Carver Press—The substrates are wrapped in aluminum foil, placed in a heated press, and after the specified time elapses, cold water is introduced into the platens. The platens are heated to achieve the curing temperature indicated, which is measured by a thermocouple attached to the laminate.

II—The substrates to be bonded are wrapped in aluminum foil and placed between the jaws of a Sentinel Heat Sealer. Lamination is effected at the specified temperature under a jaw pressure of 10 p.s.i. After the specified time has elapsed, the laminate is removed from the Sealer and allowed to cool under a cold weight exerting a pressure of 3.3 p.s.i.

The polyamides and polyepoxides useful in the practice of this invention are those described in French Patent 1,287,257. The polyamides are soluble in methanol to the extent of about 3% to about 5%. Commercial polyamides of this polyamide are at least equally soluble in lower alcohols comprising up to 4 carbon atoms. The polyamides may be prepared according to the procedure set forth in U.S. Patent 2,285,009 to Brubaker et al. Substituents on the polymerized polyamide chain, such as methyl groups, also have the effect of solubilizing the polyamide in methanol. A series of products sold under the trade name of "BCI–800 series" by Belding Corticelli Industries are soluble in methanol owing to the presence of N-alkoxyalkyl substituents, particularly N-methoxymethyl groups on a nylon 66. "BCI–809," which has a dilution value of 45, is particularly suited to the present invention. Another member of this series, "BCI–829," which has dilution value of 80, also improves the polyepoxides used without other modifications in the adhesive compositions of the present invention, although to a smaller extent. Methanol-soluble polyamide copolymers are also suitable for the invention. Methanol-soluble polyamides are described in greater detail in the publication "Polyamide Resins," by Floyd, Rheinhold, 1958, pages 15 to 24.

All polyepoxides which can be hardened by heat are useful in the present invention. Of these, polyepoxides having an epoxide equivalent weight of from about 150 to about 315 are preferred. Commercially available epoxy resins within this preferred range are sold under the trade names "Epon–812," "Epon–815," "Epon–820," "Epon–828," "Epon–834," and "Epon–836," by Shell Development Corp. The epoxide equivalent weights of these resins are 150, 185, 189, 189, 255, and 315, respectively. These named resins are derived from the reaction of epichlorohydrin with either glycerin or with p,p'-isopropylidene-bis-phenol(Bisphenol A).

Of that component of the curing agent composition which has the formula

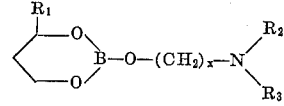

wherein $x$ is an integer from 1 to 5 and $R_1$, $R_2$, and $R_3$ are either hydrogen or lower alkyl groups, the preferred member is that wherein $R_1$, $R_2$, and $R_3$ are methyl and $x$ is 2. By lower alkyl is meant an aliphatic hydrocarbon radical having up to five carbon atoms. Of these, methyl, ethyl, and propyl are preferred.

The polyamides and polyepoxides of this invention may be combined in all proportions to provide compositions having useful adhesive properties. For most applications it is preferred to use a composition containing about 50% to about 95% of the polyamide and about 5% to about 50% of the polyepoxide based on the combined weight of the polyamide and the polyepoxide.

The phenolic resins useful in the practice of this invention are the phenolformaldehyde resins of the spirit soluble, heat-reactive type. Included in this class of resins are the paraphenyl-phenolformaldehyde resins and the alkylated-phenolformaldehyde resins. These phenolic resins are soluble in alcohols, esters, aromatic hydrocarbons, ketones, nitrohydrocarbons, and chlorinated hydrocarbons.

Dioxaborinane compounds of the formula

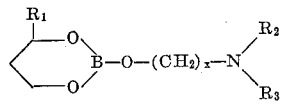

may be present in the bonding composition to the extent of from about 5 to about 15 parts per hundred by weight of epoxy resin, with 10–15 parts being preferred. Cyanoguanidine, urea, and thiourea also may be present to the extent of from about 5 to 15 parts per hundred by weight of epoxy resin. It has been discovered, however, that when the curing agent composition consists only of a dioxaborinane compound and cyanoguanidine, urea, or thiourea, the weight ratio of the dioxaborinane compound to the latter compounds must not exceed about 1.5 and preferably is 1. The phenolic resin may be present to the extent of from about 2.5 to about 10.0 parts per hundred by weight of epoxy resin. Of the variety of compositions disclosed, a composition in which the dioxaborinane and cyanoguanidine are both present to the extent of about 10 parts per hundred by weight of epoxy resin is preferred.

In addition to those components of the bonding composition of this invention previously mentioned, various fillers such as finely divided metals, metallic oxides, mineral powders, and the like may be added to decrease shrinkage, provide reinforcement, and lower the coefficient of thermal expansion. These materials, which may be present to the extent of up to about 70% based on the combined weight of the polyamide and epoxy resin, include copper powder, aluminum powder, iron powder, lithium aluminum silicate, silica, calcium carbonate, asbestos, mica, and quartz.

The bonding composition disclosed herein may be used to bond expensive metal foils such as stainless steel, aluminum, brass, and nickel to less expensive metals such as zinc coated steel, galvanized steel, aqueous and triphosphatized steel, and zinc-phosphatized steel.

The surface of the various substrates to be bonded may be pre-treated with aqueous or trichloroethylene phosphate, zinc phosphate, tri-sodium phosphate, epoxy and phenolic primers, and silicon resin. Pre-treatment is not necessary, however, in order to obtain suitable laminated structures.

The curing composition of this invention permits the achievement of optimum adhesive properties for a polyamide-polyepoxide adhesive system whereby commercially suitable laminates of various kinds can be produced. Although this invention has been described with particular application to metal/metal laminates, the bonding composition of this invention can be employed with other conventional substrate materials.

Particular commercial applications of metal laminates would include decorative auto trim, architectural cabinets, window frames, sinks, auto bumpers, and many others. A significant savings would accrue since the underside of the laminated structure could be made of a less expensive, nonaesthetic metal.

As many widely different embodiments of this invention may be made without departing from the spirit and scope thereof, it is to be understood that this invention is not limited to the specific embodiments thereof except as defined in the appended claims.

What is claimed is:
1. A bonding composition comprising (I) an adhesive composition comprising about 50 to 95 weight percent of (A) methanol-soluble polyamide having recurring units of the formula

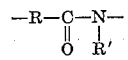

wherein R is hydrocarbylene and R' is hydrogen, alkyl or alkoxyalkyl, and about 5 to 50 weight percent of (B) heat-hardenable polyepoxide having more than one

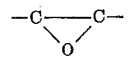

group per molecule; and (II) a curing composition comprising, per hundred weight parts of (B), about 5 to 15 weight parts of (C) a compound of the formula:

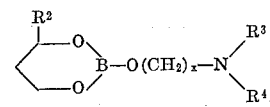

wherein $x$ is an integer of from 1 to 5 and each of $R^2$, $R^3$ and $R^4$ is hydrogen or lower alkyl, and (D) at least one of (a) a total of about 5 to 15 weight parts of nitrogeneous compound of the class consisting of cyanoguanidine, urea and thiourea, the weight ratio of (C) to said nitrogeneous compound not exceeding about 1.5, and (b) about 2.5 to 10 weight parts of phenolic resin.

2. A metal/metal laminate bonded with the composition of claim 1.

3. A composition according to claim 1 wherein (D) is cyanoguanidine.

4. A metal/metal laminate bonded with the composition of claim 3.

5. A composition according to claim 3 wherein (C) is 2-(beta - dimethylaminoethoxy)-4-methyl-1,3,2-dioxaborinane.

6. A metal/metal laminate bonded with the composition of claim 5.

7. A composition according to claim 1 wherein (D) is a phenolic resin.

8. A composition according to claim 7 wherein (C) is 2-(beta - dimethylaminoethoxy)-4-methyl-1,3,2-dioxaborinane.

9. A metal/metal laminate bonded with the composition of claim 8.

10. A process for curing an adhesive composition (I) comprising (A) methanol-soluble polyamide having recurring units of the formula

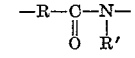

wherein R is hydrocarbylene and R' is hydrogen, alkyl or alkoxyalkyl, and (B) hard-hardenable polyepoxide having more than one

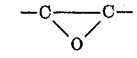

group per molecule which comprises intimately admixing said adhesive composition with a curing composition (II) comprising (C) a boron compound having the formula:

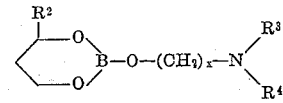

wherein $x$ is an integer of from 1 to 5 and each of $R^2$, $R^3$ and $R^4$ is hydrogen or lower alkyl and (D) at least one compound selected from the class consisting of cyanoguanidine, urea, thiourea and a phenolic resin; then heating the resultant mixture to a temperature of about 370° F. to 500° F. for about 30 to 60 seconds.

11. Process according to claim 10 wherein (I) comprises about 50 to 95 weight percent (A) and about 5 to 50 weight percent (B) and (II) comprises, per 100 weight parts of (B), either (a) about 5 to 15 weight parts of nitrogenous compound of (D), the weight ratio of (C) to nitrogenous compound not exceeding about 1.5, or (b) about 2.5 to 10 weight parts of phenolic resin.

12. Process according to claim 11 wherein (D) is cyanoguanidine.

13. Process according to claim 12 wherein (C) is 2-(beta - dimethylaminoethoxy) - 4 - methyl - 1.3.2 - dioxaborinane.

14. Process according to claim 11 wherein (D) is phenolic resin.

15. Process according to claim 14 wherein (C) is 2-(beta - dimethylaminoethoxy) - 4 - methyl - 1.3.2 - dioxaborinane.

16. A process for making metal/metal laminates which comprises (1) applying to at least one of the substrates to be bonded a bonding composition comprising (I) an adhesive comprising about 50 to 95 weight percent of (A) methanol-soluble polyamide having recurrent units of the formula

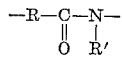

wherein R is hydrocarbylene and R' is hydrogen, alkyl or alkoxyalkyl and about 5 to 50 weight percent of (B) heat-hardenable polyepoxide having more than one

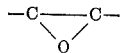

group per molecule and (II) a curing composition comprising (C) a boron compound having the formula:

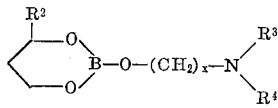

wherein $x$ is an integer of from 1 to 5 and each of $R^2$, $R^3$ and $R^4$ is hydrogen or lower alkyl, and (D) at least one compound of the class consisting of cyanoguanidine, urea, thiourea and phenolic resin, (2) then sandwiching the substrates to be bonded together, and (3) thereafter curing the bonding composition.

17. The process of claim 16 when done in a continuous manner.

18. The process of claim 16 wherein said curing of said bonding composition is done at about 370° F. to 500° F. for from about 30 to 60 seconds.

19. The process of claim 18 when done in a continuous manner.

20. The process of claim 16 wherein (I) comprises about 50 to 95 weight percent (A) and about 5 to 50 weight percent (B) and (II) comprises, per 100 weight parts of (B) either (a) about 5 to 15 weight parts of cyanoguanidine, the weight ratio of (C) to cyanoguanidine not exceeding about 1.5, or (b) about 2.5 to 10 weight parts of phenolic resin.

21. Process of claim 20 when done in a continuous manner.

22. Process of claim 20 wherein said curing of said bonding composition is done at about 370° F. to 500° F. for about 30 to 60 seconds.

23. Process of claim 20 when (C) is 2-(beta-dimethylaminoethoxy)-4-methyl-1.3.2-dioxaborinane, and (D) is cyanoguanidine.

24. Process of claim 23 when done in a continuous manner.

25. Process of claim 23 wherein said curing of said bonding composition is done at about 370° F. to 500° F. for about 30 to 60 seconds.

26. Process of claim 20 wherein (D) is a phenolic resin.

27. Process of claim 26 when done in a continuous manner.

28. Process of claim 26 wherein said curing of said bonding composition is done at about 370° F. to 500° F. for about 30 to 60 seconds.

No references cited.

MURRAY TILLMAN, *Primary Examiner.*

P. LIEBERMAN, *Assistant Examiner.*